United States Patent [19]
Nyyssonen

[11] Patent Number: 5,186,041
[45] Date of Patent: Feb. 16, 1993

[54] MICROPROBE-BASED CD MEASUREMENT TOOL

[75] Inventor: Diana Nyyssonen, Hopewell Junction, N.Y.

[73] Assignee: International Business Machines Corporation, Armonk, N.Y.

[21] Appl. No.: 852,849

[22] Filed: Mar. 16, 1992

Related U.S. Application Data

[63] Continuation of Ser. No. 619,378, Nov. 28, 1990, abandoned.

[51] Int. Cl.$^5$ .............................................. G01B 5/28
[52] U.S. Cl. .................................................... 73/105
[58] Field of Search ........................... 73/105, 865.8; 33/556–561; 250/306

[56] References Cited

U.S. PATENT DOCUMENTS

| | | | |
|---|---|---|---|
| 4,168,576 | 9/1979 | McMurtry | 33/559 |
| 4,434,559 | 3/1984 | Lauer et al. | 33/560 |
| 4,603,487 | 8/1986 | Matsunata | 33/556 |
| 4,621,434 | 11/1986 | Hirschmann | 33/558 |
| 4,788,772 | 12/1988 | Van Sickle et al. | 133/557 |
| 4,987,303 | 1/1991 | Takase et al. | 73/105 |
| 5,025,658 | 6/1991 | Elings et al. | 73/105 |
| 5,036,196 | 7/1991 | Hosaka et al. | 250/423 F |

FOREIGN PATENT DOCUMENTS

| | | |
|---|---|---|
| 413040A1 | 2/1991 | European Pat. Off. . |
| 413041A1 | 2/1991 | European Pat. Off. . |
| 413042A1 | 2/1991 | European Pat. Off. . |
| 63-49782 | 12/1989 | Japan . |

OTHER PUBLICATIONS

G. Binnig, et al, "Atomic Force Microscope" Physical Review Letter, vol. 56, No. 9, pp. 930–933 (Mar. 3, 1986).
Y. Martin, et al, "Atomic Force Microscope-force Mapping and Profiling on a Sub 100–Angstroms Scale" J. Appl. Phys. 61 (10) pp. 4723–4729 (May 15, 1987).
D. Nyyssonen, "A New Approach to Image Modeling and Edge Detection in the SEM" To be published Proc. SPIE, vol. 921, pp. 48–56 (Mar. 1988).
T. R. Albrecht, et al, "Atomic Resolution with the Atomic Force Microscope on Conductors and Nonconductors" J. Vac. Sci. Technol. A6 (2) pp. 271–274 (Mar./Apr. 1988).
"Microprobe-Based CD Measurement Tool" IBM Technical Disclosure Bulletin, vol. 32, No. 7, p. 168 (Dec. 1989).
D. Rugar et al., "Atomic Force Microscopy" Physics Today, pp. 23–30 (Oct. 1990).
T. Fujii, et al., "Micro Pattern Measurement with an Atomic Force Microscope" International Meeting of STM 1990/Nano I in Baltimore, MD pp. 1–15.
Claim 1 and Figure of U.S. Pat. No. 4,506,154 in Official Gazette.

*Primary Examiner*—Robert R. Raevis
*Attorney, Agent, or Firm*—Graham S. Jones, II

[57] ABSTRACT

A metrology system measures the depth and width of a trench in a sample to be tested with a probe moved relative to the sample. The system detects the proximity of the probe to a sample and to the side walls of the trench, providing output signals indicating the vertical and transverse relationship of the probe to the sample. The system adjusts the relative position of the probe and the sample vertically and transversely as a function of the output signals. The probe has three protuberances to detect the depth and width of the trench. One protuberance extends down to sense the bottom of the trench. Lateral protuberances extend in opposite directions (across the width of the trench) from the probe to detect the side walls of the trench. Forces on the protuberances are measured to determine the depth and the location of the side walls of the trench.

22 Claims, 5 Drawing Sheets

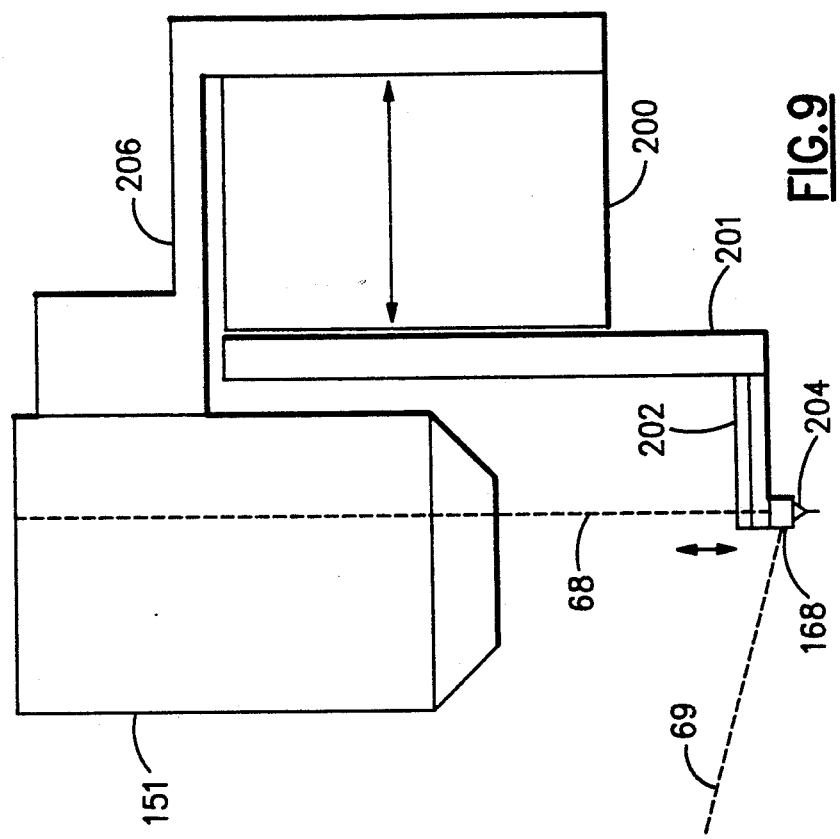
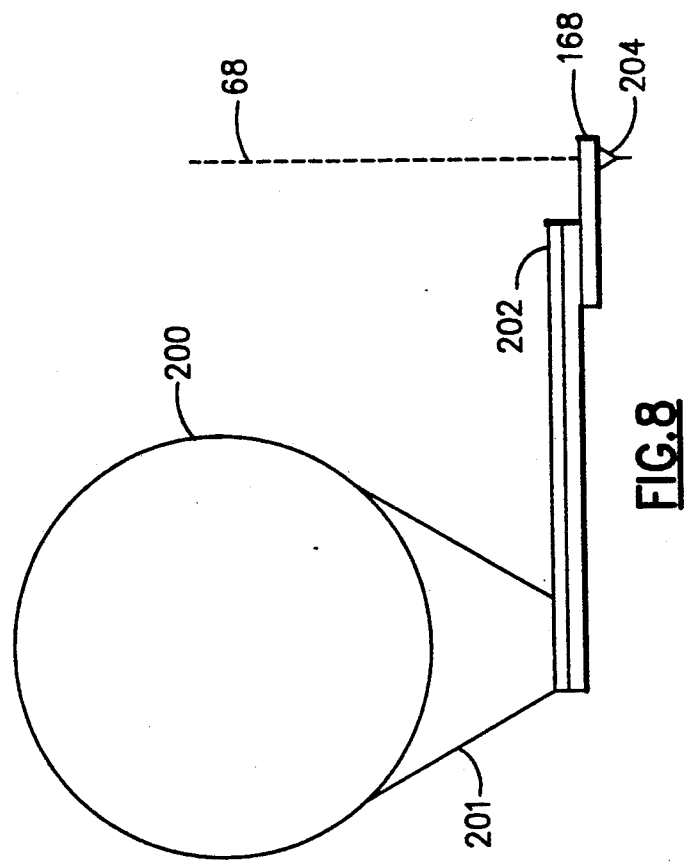

MICROPROBE-BASED CD MEASUREMENT TOOL

This application is a continuation of application Ser. No. 07/619,378 filed Nov. 28, 1990, now abandoned.

BACKGROUND OF THE INVENTION

1. Field of the Invention

The present invention relates to metrology, and more particularly to line width and overlay metrology.

2. Description of Related

In the original atomic force microprobe, a very small probe tip with a submicron radius floats across a slowly undulating surface with displacements at the nanometer level. The tip is vibrated perpendicular to the surface and depending upon the distance from the surface, a change in resonance occurs due to the Van der Waal's force between the surface and the tip. The change in resonance is sensed with a laser heterodyne interferometer. The tip can be maintained either at a fixed height through a feedback loop or the change in resonance can be converted to a height signal. The sensitivity of the change in resonance allows accurate height measurements at the subnanometer level. The microprobe force range is in the range of a few tens of nanometers and in this mode of operation, the tip remains within the force range as the specimen is scanned using a piezo-electric scanning stage.

The principal drawback to this mode of operation is the limited resolution and accuracy of the measurements in the lateral x-direction due to tip geometry. Resolution is a function of step height or slope of the surface as shown in FIG. 1A and FIG. 1B. FIG. 1A shows a microprobe tip 17 of probe 19 following a slowly undulating surface 16. FIG. 1B tip 17 shows a nearly vertical step 18. The point corresponding to maximum probe force changes during the scan especially for the case of FIG. 1B. For nearly vertical edges it is limited to the radius of the tip at the step height. Current parabolic tungsten tips have a tip radius of approximately 0.5 micrometers and 0.1 micrometers and smaller have been fabricated in other materials.

PROBLEMS WITH CRITICAL DIMENSIONS (CD), LINEWIDTH AND OVERLAY MEASUREMENTS

It has been proposed that an atomic force microprobe be used for (Critical Dimension) CD linewidth and overlay measurements for future submicrometer feature dimensions, 0.35 micrometers and below. The principle drawback has been the tip geometry and attempts have been made to make smaller probe tips. However tip geometry is not the only problem with the instrument. From a metrology point of view, one needs independent lateral (x) and height (z) dimensional measurements (at a fixed height). Even if one were to add a vibration and interferometric sensing system for the change in resonance in the x direction, the mode of operation described above has a second problem-the tip goes in and out of the x-direction force range in scanning across a line or trough with steep edge slopes.

Systems have been developed utilizing probe technology.

For example, Y. Martin, C. C. Williams, and H. K. Wickramasinghe wrote "Atomic Force Microscope-Force Mapping and Profiling on a Sub-100 Angstrom Scale", Journal of Applied Physics, Vol. 61 (10), 4723-4729 (May 15, 1987) describing a modified atomic force microscope employing a tungsten tip at the end of a wire mounted on a piezoelectric transducer. The transducer vibrates the tip at the resolution frequency of the wire, which acts as a cantilever. A laser heterodyne interferometer accurately measures the amplitude of the ac vibration. The long range force between the tip and the sample is an attractive force of the van der Waals type. When the tip comes close to the sample, the force of attraction becomes significant and the force required to pull the tip away from the surface of the sample can be measured. A polarized laser beam is reflected off the wire carrying the tip to monitor the "the vibration of the lever even when it is excited into vibrations having amplitudes of several hundred angstroms ..." A laser probe structure is shown in FIG. 1 of that article.

G. Binnig, C. F. Quate, and C. Gerber, "Atomic Force Microscope," Physics Review Letters Vol. 56 930-933 (1986) describes an atomic force microscope.

U.S. Pat. No. 4,883,959 of Hosoki et al for "Scanning Surface Microscope Using a Micro-Balance Device for Holding a Probe-tip" describes a probe tip which can detect a Vander Waals' force. The probe tip is placed on a balance bar which is part of a micro-balance apparatus. A magnetic member controls the magnetic field to control the equilibrium of the micro-balance apparatus. The atomic forces on the probe cause the micro-balance to be displaced by the negative forces between the probe tip and the surface of the sample. Note that a negative force is employed in Hosoki et al as contrasted with the positive force employed in the Martin et al system.

An abstract of a Japanese Published Application No. JP 01-224603 of Yamada and Fujii for "Wide-Range Scanning Type Tunnel Microscope" describes a "scanning type tunnel microscope observing object surface has micro scanning actuator driving X=Y surfaces, and measuring head on X=Y swing arm and moving Z-direction".

"Microprobe-Based CD Measurement Tool," IBM Technical Disclosure Bulletin, Vol. 32, No. 7, page 168 (Dec. 1989) describes "a metrology tool which utilizes the atomic force microprobe (AFM) ... as a surface sensor and is specifically designed for measuring trench depth and width ..." The system "incorporates a two-dimensional length measurement system, such as a two-axis laser interferometer in addition to a two-dimensional laser heterodyne system which detects the change in resonance of the vibrating probe tip as it approaches the surface. The probe tip may be vibrated in either the horizontal or vertical direction depending upon which surface is being approached. The mean position of the probe tip is held stationary while the wafer or other part being measured is moved parallel or perpendicular to its surface and the displacement measured." The article described use of "a three-point probe tip with well-defined sensor points for detecting the bottom, right and left edges of the trench. The probe tip is lowered into the trench using robotic motions. The tip is then moved from left to right at a specific height above the bottom of the trench. Trench widths are thereby measured as a function of height, and thus, edge slope can be determined. When the tip dimensions are known, accurate measurements of trench dimensions can be made. In addition, this system provides accurate control of tip position, thereby preventing accidental tip damage." This article is incorporated herein by reference.

SUMMARY OF THE INVENTION

An object of this invention is to change the mode of operation of atomic force microprobe metrology instruments as well as the tip geometry to achieve accurate and independent x and z- distance measurements needed for CD linewidth and overlay metrology. Preferably, a positive force system is employed for detecting atomic forces.

In accordance with this invention, a metrology system is provided for dimensionally measuring a sample and including a probe, means for moving the probe relative to the sample, means for detecting proximity of the probe to the sample and to the side walls of features of the sample providing output signals indicative of the vertical and transverse relationship of the probe to the sample, and means for adjusting the relative position of the probe and the sample in the vertical and transverse directions as a function of the output signals.

In another aspect of this invention, a metrology system is provided for measuring the dimensions of a structure on a sample including a probe having a plurality of protuberances for detection of the depth and width of a features of the sample to be measured and at least one protuberance extends laterally from the probe for detecting the side walls of a feature of the structure. Means is provided for measuring the forces on the protuberances for determining the depth and the location of the side walls of the feature. Preferably, the protuberances extend in opposite directions laterally from the probe, with at least one probe extending downwardly.

BRIEF DESCRIPTION OF THE DRAWINGS

FIGS. 1A and B show that the point corresponding to maximum probe force changes during the scan. For nearly vertical edges it is limited to the radius of the tip at the step height.

FIGS. 8 and 9 are a left side view and an elevational front view of the apparatus for mounting and vibrating a probe used in the system of FIGS. 6 and 7.

The foregoing and other objects, features and advantages of the invention will be apparent from the more particular description of the preferred embodiment of the invention which follows.

DESCRIPTION OF THE PREFERRED EMBODIMENT

Disclosure of the Invention

This system is adapted for measuring the width (x) and depth (z) of trenches at various (y) positions along the trench. The trench is first lined up with the y axis of the measuring system parallel to the trench.

The system incorporates a two-dimensional probe sensing system comprising a two axis laser heterodyne interferometer preferably with a probe tip adapted for sensing surfaces in both the x and z directions inside trenches in the work pieces being measured.

Surface Sensing, Tip Geometry and Mode of Operation

Figure 2:
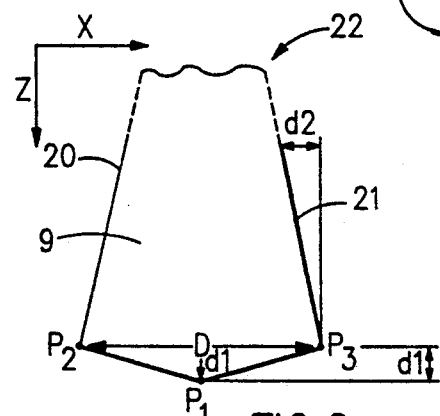
FIG. 2 shows an atomic-force microprobe with three protruding points in accordance with this invention.

The atomic-force microprobe 9 shown in FIG. 2 is a depth and width sensor which indicates when the probe is a given distance from a surface to be sensed. For measurement, it is not used in the conventional scanning mode. First, the tip geometry must be of the form shown in FIG. 2 which is a tip geometry of a preferred tip design for an atomic force microprobe system in accordance with this invention. The probe 9 of FIG. 2 has three protruding points P1, P2 and P3 in the relative positions shown. Probe 9 has distal and proximal ends. Point P1 is at the distal end of probe 9 and points P2 and P3 are proximate thereto near the distal end. The distance d1 will determine how closely to the bottom surface a width measurement can be made and should be in the 10–50 nm range. The distance d2 should be large enough so that only the points P2 and/or P3 come within atomic force range of the surface in the x-direction measurement. The dimension d2 will also be determined by the amount of expected undercut in the edge geometry to be measured. The dimension D should be less than the narrowest trench width to be measured. For example D is preferably less than 0.35 micrometers for a 0.5 micrometer trench.

The exact shape of the tip of probe 9 of FIG. 2 is not important providing there are three distinct protuberances that will be the sensor points for measurements, one in the z-direction and two in the x-direction one each for right-edge and left-edge sensing. In the direction perpendicular to the cross-section, again, the exact geometry is unimportant as long as in three dimensions, only the three probe points of the surface of probe 9 come within probe force range during a measurement. Therefore the tip of probe 9 can be either rotationally symmetric or it can maintain the same cross-sectional shape but with a taper in the perpendicular, y-direction.

Here, the tip of probe 9 is vibrated and the change in resonance of the tip of probe 9 is sensed in both the x-direction and the z-direction using laser heterodyne interferometry as is conventionally done in the z-direction only.

Distance Measurement

Because the probe tip is allowed deliberately to go in and out of force sensing range in both the x-direction and the z-direction, an additional means of tracking the probe position is required. This is achieved by adding x-direction and z-direction interferometry accurate within the sub-nanometer range.

Typical Path

Figure 3:
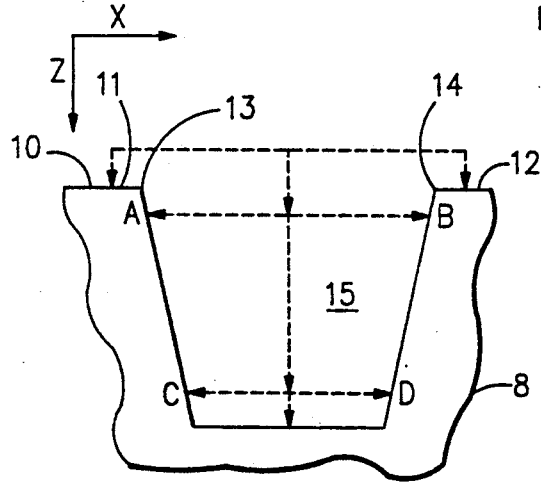
FIG. 3 is a diagram of a trench in a surface of an object of the type a probe in accordance with this invention is designed to measure.

FIG. 3 is a diagram of a trench 15 in the top surface 10 of an object 8. While FIG. 3 shows a trench which is most difficult to measure, this invention is applicable to other geometries such as holes, raised lines, mesas, etc. There are dotted line traces illustrating the motion of the tip P1 of the probe 9 during a typical measurement of the dimensions of the surface 10 of object 8 including trench 15. FIG. 3 shows with dotted line traces a typical path of probe tip P1 during a measurement by probe 9 in accordance with this invention. The height of the top surface 10 is sensed at points 11 and 12 to the right and the left of the trench 15. (Leveling can be done if necessary.) If the tip P1 of probe 9 is then scanned at a fixed height above the top surface 10, the approximate locations of the left edge 13 and the right edge 14 of trench 15 in surface 10 can be determined by locating the x-positions at which the probe tip P2 or P3 goes into and out of critical force sensing range. From these positions, the center of the trench 15 can be determined and the tip P1 can descend near the center to a predetermined upper height below the top surface. At that predetermined upper height one can use the probe to determine the lateral distance AB between points A and B. The probe 9 can then be lowered at or near the center of the trench 15 until the bottom surface is within the force sensing range of the probe. At any desired height above the bottom surface greater than d1 in FIG. 2, the lateral distance CD can be measured between points C and D. From the (x,z) locations of the four points A, B, C, D, the widths AB and CD are known as well as the edge slopes and the asymmetry of the trench. (It has been assumed that the trench has been aligned previously and has been positioned with respect to the y-direction.)

Advantage for Microcontrol

In the conventional scanning mode, in addition to producing inaccurate lateral measurements, there is no feedback and control system for motions in the lateral direction and the probe 9 is, therefore, easily damaged by bumping into the vertical side walls of a trench 15. By descending at or near the center of the trench 15, and moving to the right or left until the tip of the probe 9 comes within the critical force range which is sensed by the probe, full control of the probe and its tip is achieved, thereby eliminating tip damage.

In practice, as is done with fine focussing mechanisms, this system uses a succession of fine motion control and sensing systems. For example, for course positioning, an auxiliary optical system can be used to bring the probe near the critical force range of the top surface. Optical pattern recognition techniques can be used both for locating the feature to be measured and for alignment with mechanical stages for coarse positioning. Piezoelectric stages are then used for fine positioning and measurement.

Calibration of the Microprobe Tip

Figure 1A:
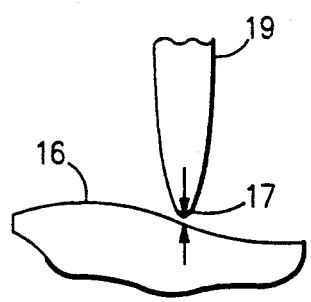
FIG. 1A shows a prior art microprobe tip with its tip following a slowly undulating surface.
Figure 1B:
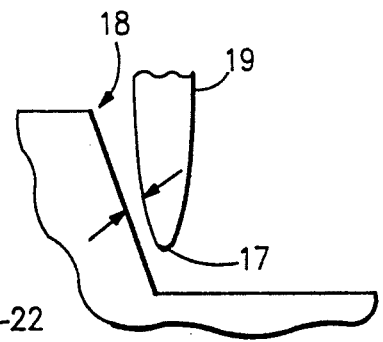
FIG. 1B shows a prior art microprobe tip near a vertical step.
Figure 4A:
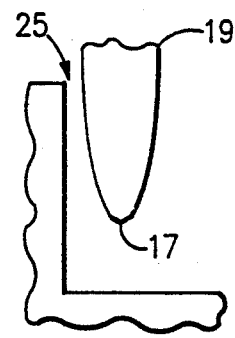
FIG. 4A shows the geometry of the probe of FIG. 1A when it is next to a steep edge.
Figure 4B:
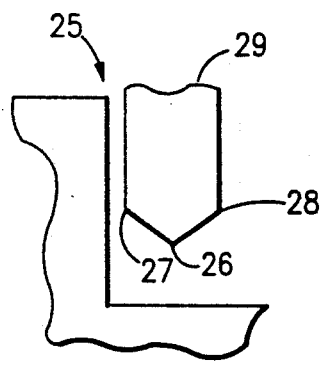
FIG. 4B shows a modified probe with a sharp tip in the center and edges and where the tip is triangular and the sides of the probe are vertical near the steep edge.
Figure 4C:
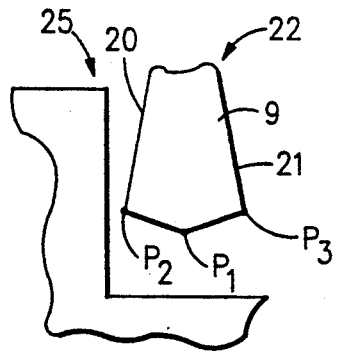
FIG. 4C shows the probe with the three points (tips) of FIG. 2, near the steep edge.

One of the basic problems of dimensional measurements with the microprobe is calibration of the tip. That is, determination of the tip dimensions and more particularly the geometry of the tip of the probe 9. Tungsten tips are approximately parabolic in shape and can vary in radius due to the method of manufacture. When scanning deep edged trenches 15, the point of the tungsten tip which determines the maximum force and resulting change in resonance varies with height and for some heights, it does not come within force range at all. Accurate measurements can be made only at the width at the top of the trench 15, and then only when the exact geometry of the tip is known and can be deconvolved from the measured profile. An improved tip design currently being pursued is made by etching silicon along the crystal planes and it results in a known tip geometry with a very small tip radius. However, the angle of the tip is such that the tip does not come within force range for edge slopes steeper than the tip angle. FIGS. 4A–4C show probe tip geometries in relation to steep edge structures. FIG. 4A shows the geometry of the probe 17 of FIG. 1A when it is next to a steep edge 25. FIG. 4B shows a modified probe 29 with a sharp tip 26 in the center and edges 27 and 28 where the tip is triangular and the sides of the probe are vertical. FIG. 4C shows a probe 9 in accordance with FIG. 2 which has the probe tips P1 in the center on the bottom of the probe extending below the rest of the probe and the outboard extending tips P2 and P3 above the tip P1 with the inwardly tapering walls 20 and 21 of the probe which reach up to the narrower neck 22 of probe 9.

Method of Calibration

The design for a probe 9 described herein does not require the exact knowledge of the geometry of the tips of the probe, so long as the three points P1, P2 and P3 are the only ones that come within the proximity to physical contact required for the critical force range to the object under test during a measurement. For this tip design we need to know only the distances D and d1 in FIG. 2.

Figure 5:
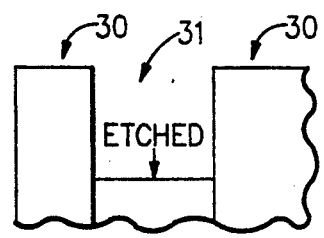
FIG. 5 is a sectional view of a specially constructed specimen for use in one method of calibrating the tip dimensions. The specimen of FIG. 5 is multilayered, cleaved and etched to produce a trench of known dimensions.

One method of calibrating these distances is the use of specially constructed specimens shown in FIG. 5 for measuring tip dimensions D and d1, as follows:
1) A multilayered specimen as shown in FIG. 5 is cleaved 30 and etched to produce a trench 31.
2) The intermediate layer thickness is measured ellipsometrically before addition of the top layer.
3) Once the trench width is measured using the probe tip, tip dimension D can be determined.

In addition, the vertical dimension d1 can be determined by making a series of measurements of the same trench starting at the top surface and measuring the width for incremental changes in height. The height below the top surface at which the trench width no longer changes gives the dimension d1.

Tip Manufacture

The preferred method for making tips controllably with small dimensions is described in Lee and Hatzakis J. Vac. Sci. Technol. B7(6) (Nov./Dec.) 1989, pp. 1941–1946 which is incorporated herein by reference.

Alternatively, microlithographic techniques analogous to those used for preferential etching of silicon tips can be employed except that etching is not along the crystal planes. A metal layer is patterned to produce an anvil-like structure. Any taper which occurs in the y-direction due to etching of a thick metal layer is desirable.

Microprobe Control System

Figure 6:
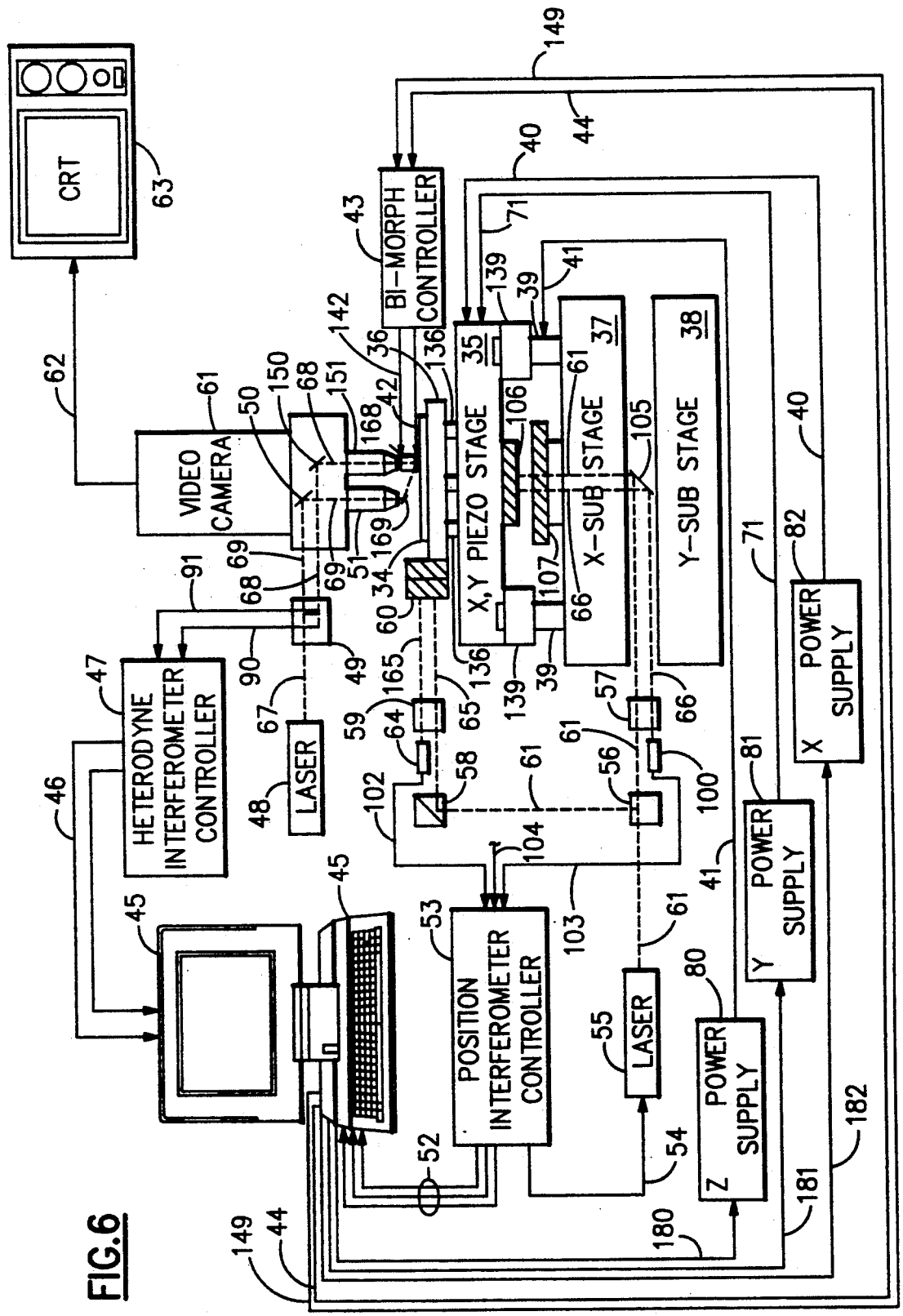
FIG. 6 shows a probe measuring system including a control system in accordance with this invention.

FIG. 6 shows a probe measuring system including a control system in accordance with this invention. An X,Y piezoelectric stage 35 (see U.S. Pat. No. 4,506,154) supports a plurality of elements 136 supporting sample holder 36 carrying a sample 34. The X, Y stage is supported by a set of three separate actuators for the fine Z motion of the stage. There are an X-sub stage 37, and a Y-sub stage 38. The trench is initially centered under the probe using the X and Y substages. The position of the trench is monitored by an interferometric laser system during measurement. Z-piezoelectric transducers 39 support elements 139 which carry the stage 35 above x-sub stage 37, which in turn is supported upon Y-sub stage 38, with a slideable relationship between stages 37 and 38. Line 40 connects from x high voltage power supply 82, controlled by the microcomputer 45, to the x piezo elements embedded inside the stage 35, as will be well understood by those familiar with piezoelectric stages. The x piezo elements provide micromotion of the sample holder 36 in the x direction. Line 41 connects from Z-high voltage power supply 80 controlled by line 180 from the computer 45 to actuate the z piezoelectric transducers 39. Thus computer 45 actuates the z piezo elements 39 beneath the surface of stage 35. Line 181 from computer 45 controls the Y-high voltage power supply 81 to control the voltage on line 71 to the y position piezo actuators on stage 35. Thus computer 45 actuates the y piezo elements inside of stage 35. Line 182 from computer 45 controls the x-high voltage power supply 82 to line 41 to the y position piezo actuators on stage 35. Thus, in summary computer 45 actuates the x and y piezo elements of stage 35. The signals on lines 180, 181 and 182 to the power supplies 80-82 are produced based upon the data fed back from the position interferometer controller 53 (as a function of position information received thereby) to computer 45 on lines 52. Feedback is provided to the computer and the above circuits to locate the x,y piezo stage as desired with a fine positioning system.

Line 42 from bimorph controller 43 connects to the x probe vibrator (bimorph or piezo element) for lever arm 168. The bimorph controller 43 is energized by the line 44 from the microcomputer 45. Line 144 provides a similar function for the z probe vibrator (not shown).

Figure 7A:
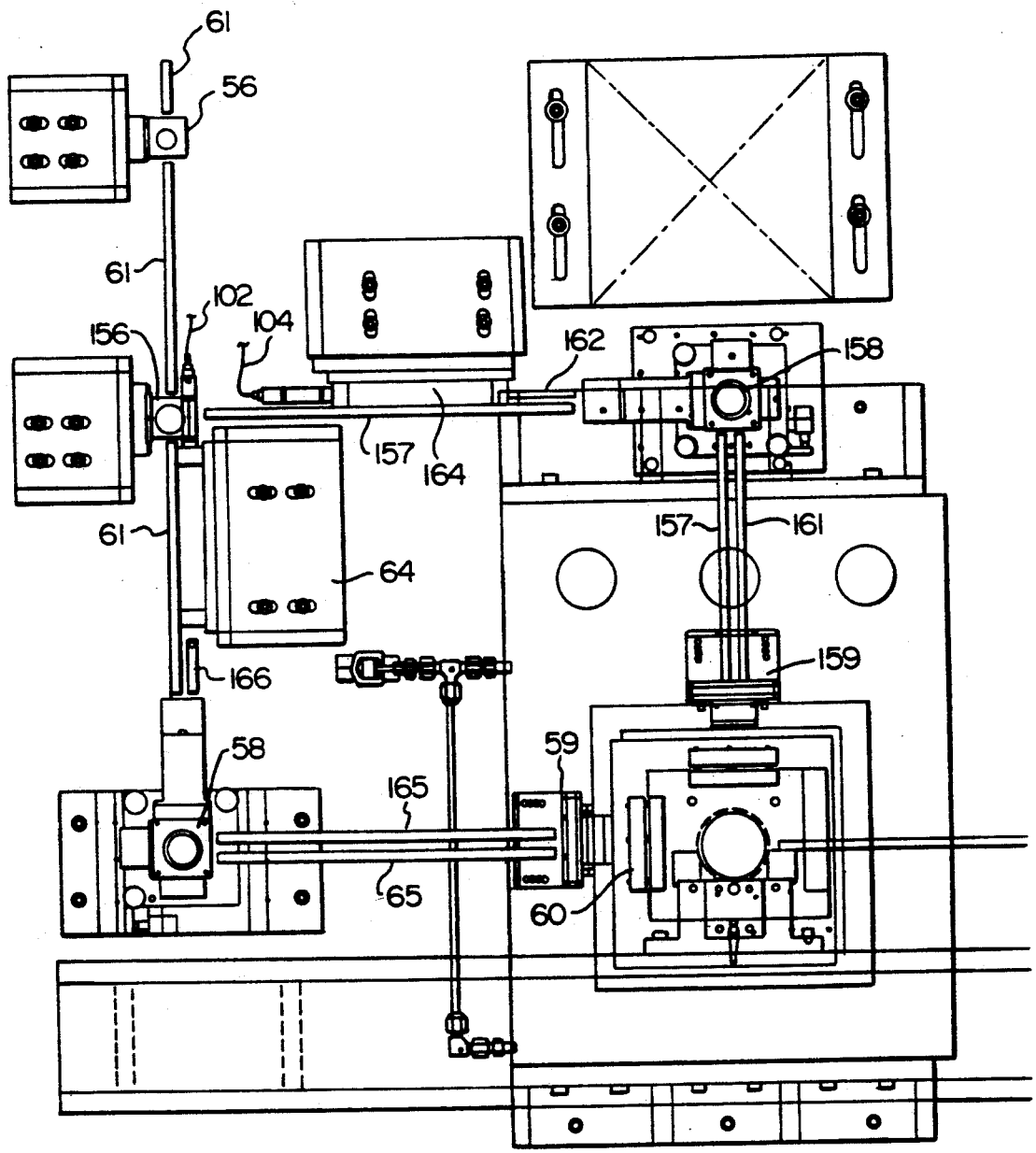
FIGS. 7, 7A and 7B show a plan view of a laser interferometer position measuring system and a heterodyne interferometer adapted for controlling a stage and a probe in accordance with this invention, particularly with reference to the system of FIG. 7.
Figure 7B:
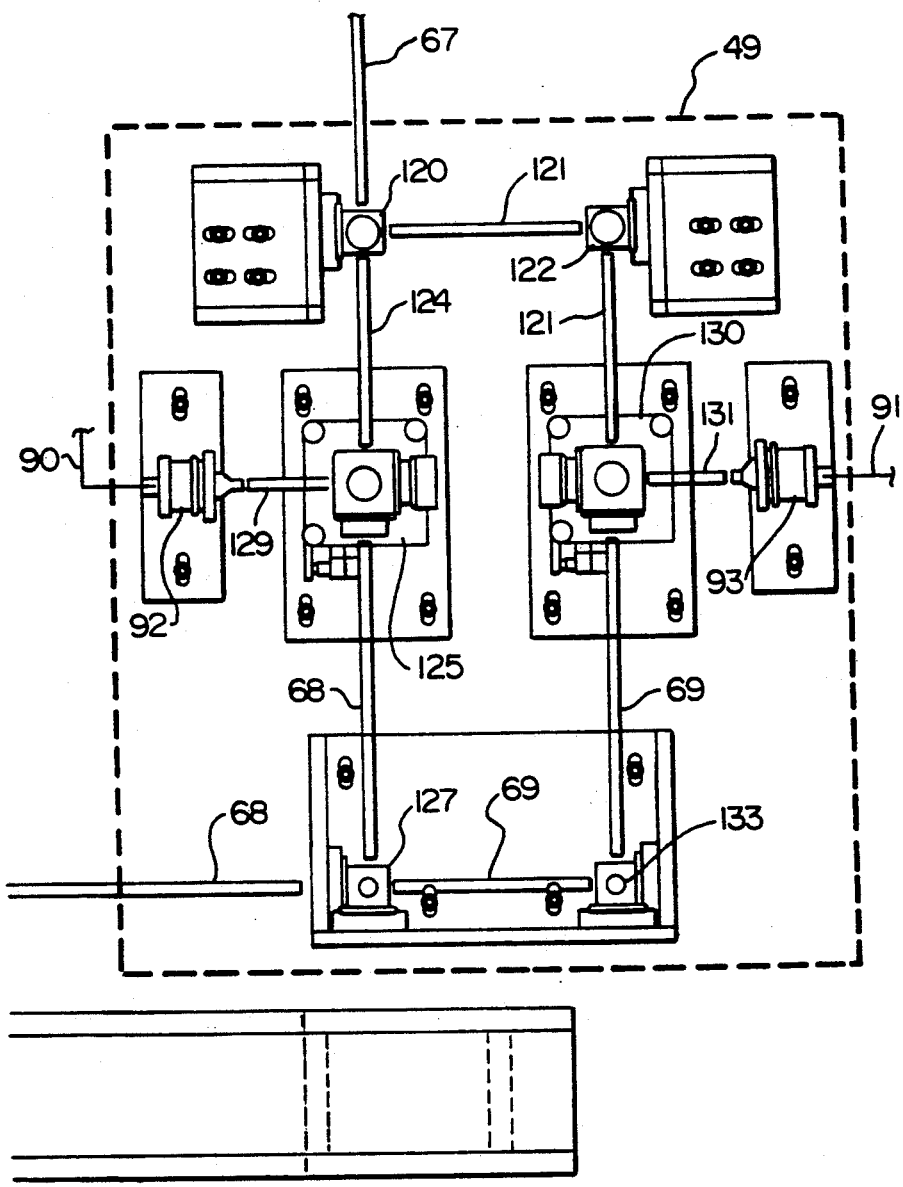
Figure 7:
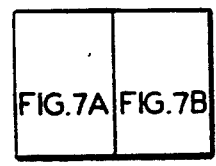

Laser 48 directs a laser beam 67 to a double axis heterodyne interferometer 49, shown in detail in FIG. 7. In particular, beam 67 passes into beam splitter 120 which passes beam 124 to interferometer 125 (which includes a polarizing beam splitter, mirror and quarter wave plate) and reflects beam 121 comprising the remainder of the beam 67 to 90 degree mirror 122, which directs beam 121 down to interferometer 130. Interferometer 125 passes beam 68 down to 90 degree reflector 127 (as shown in FIG. 6) which passes the beam 68 to tip lever arm 168 in the Z direction. Beam 69 from interferometer 130 (which also includes a polarizing beam splitter, mirror and quarter wave plate) is bent 90 degrees by reflector 133 to pass to mirror 169 (FIG. 6) which directs the beam to reflect from the lever arm 168 to detect the resonance of the probe in the x-direction. The surface of the lever arm 168 which reflects the beam 69 and the beam itself are tilted slightly to accommodate the angles required to accommodate the mirror 169. The reflected beams from beam 68 and 69 go to the interferometers 125 and 130 and the result of the measurement is detected by the detectors 92 and 93 respectively for the x position and and z position to provide outputs on lines 90 and 91 respectively to the heterodyne interferometer controller 47 which provides outputs on lines 46 to the microcontroller 45 detecting the x and z resonances of the probe relative to the sample 36. Line 46 connects to supply signals to the microcontroller 45 from the heterodyne interferometer controller 47 which is connected to receive the output signals 90 and 91 from the double axis heterodyne interferometer 49.

The x, y, and z positions of the stage are measured by the laser source 55. Beam 61 from laser 55 is split by beam splitter 56 into two beams 61, one going via interferometer 57 (FIG. 6) to reflector 105 up through a window (not shown) in the x-sub stage to a z position reference mirror 106 cooperating with its opposite mirror 107 for the differential interferometer system, which is reflected as beam 66 to interferometer 57 and detector 100. Detector 100 provides an output signal on line 103 to position interferometer controller 53 which has three outputs on line 52 to the computer 45.

Referring again to FIG. 7, the remainder of beam 61 passes through beam splitter 61 to beam splitter 156. A second measurement is obtained by beam splitter 156, which sends part of beam 61 along path 157 to interferometer 158 which passes the beam 157 to the y-axis reference mirror 159 in FIG. 7 (not shown in FIG. 7) to be reflected back as beam 161 to interferometer 158 yielding output beam 162 which is detected by detector 164 to yield output on line 104 to controller 53.

Analogously, for the x-position, the laser beam 61 is reflected off a mirror in interferometer 58 to reflect from reference mirror system 59, 60 and be reflected back as beam 165 to the interferometer 58 yielding output beam 166 to detector 64 which provides an output signal on line 102 to position interferometer controller 53.

In a typical measurement, as the probe tip approaches the surface in a given direction (x or z), digitized position data (x and/or z) is acquired from the position interferometer controller along with a digitized voltage signal (corresponding to the approach direction) from the heterodyne controller. The latter voltage is proportional to the sideband amplitude of the heterodyne interferometer signal beam against the reference frequency which activates the lever arm. As the probe tip approaches the surface, the resonance frequency of the lever arm and tip shifts causing a drop in the sideband amplitude voltage. If the system is sufficiently stable (from vibration and noise), data may be taken until the sideband amplitude drops to approximately 10% of the value before the approach was made. The tip is withdrawn when then 10% value is reached and the data is extrapolated to determine the position of the surface (0% amplitude). To measure the width and depth of a trench, a series of such approaches are made as shown in FIG. 3. Alternatively, the entire trench surface can be mapped incrementally.

FIG. 8 shows a detailed left side view of apparatus employed in the system of FIG. 6 for supporting and vibrating the probe tip 204 with respect to the x and z axes: A piezo vibrator 200 is shown carrying a bimorph 202 attached thereto by adapter 201. On the distal end of the bimorph 202 is attached the lever arm 168 to which the probe 204 is mounted.

FIG. 9 shows a front elevation of the apparatus of FIG. 8. The vibrator 200 is supported by mounting bracket 206, which is secured to the microscope objective 205. Beam 68 is shown hitting the top of lever arm 168, as shown in FIG. 6. Beam 69 is shown hitting the side of lever arm as indicated in FIG. 6, with the tilt of the side of arm 168 substantially normal to the beam 69 so that the beam is reflected back up to the optical system, as required.

INDUSTRIAL APPLICABILITY

This invention is applicable in arts such as data processing where it can be employed in manufacturing semiconductor products for personal computers, minicomputers, large scale computers and other data processing equipment. In particular, this system and process are applicable to the manufacture of VLSI chips for industrial and consumer electronic devices. Electronic products such as transportation and control systems incorporating data processing systems for continuous monitoring and like functions can use products made by use of this invention.

What is claimed is:

1. An atomic force microprobe metrology system for dimensionally measuring a sample including
   a) a vibrating atomic force microprobe which indicates when said microprobe is a given distance from the surface to be sensed,
   b) means for moving said microprobe relative to said sample,
   c) first means for detecting vertical proximity of said microprobe to said sample and second means for detecting transverse proximity of said microprobe to the side walls of features of said sample, said first and second means for detecting providing separate vertical and transverse output signals indicative of the vertical and transverse relationship of said microprobe to said sample, and
   d) means for adjusting the relative position of said microprobe and said sample in the vertical and transverse directions as a function of said output signals, and
   e) said means for adjusting being connected to receive said output signals from said first and second means for detecting.

2. A system in accordance with claim 1 wherein said vibrating atomic force microprobe includes protuberances with at least a pair of said protuberances extending in opposing directions laterally from said microprobe, and with at least one of said protuberances extending downwardly.

3. A metrology system in accordance with claim 1, wherein said microprobe includes a plurality of protuberances protruding outwardly from said microprobe for detection of the depth and width of a feature of said sample.

4. A metrology system in accordance with claim 3, wherein said vibrating microprobe includes at least one protuberance protruding laterally from said microprobe for detecting a side wall of said feature.

5. A system in accordance with claim 1 wherein said vibrating atomic force microprobe comprises an elongated element having proximal and a distal ends, said microprobe including proximate said distal end a plurality of protuberances with at least a pair of said protuberances extending in opposing directions laterally from said microprobe, and with at least one of said protuberances extending downwardly.

6. A metrology system in accordance with claim 1, wherein said microprobe includes a plurality of protuberances for detection of the depth and width of a feature of said sample.

7. A metrology system in accordance with claim 6, wherein said vibrating microprobe includes at least one protuberance extending laterally from said microprobe for detecting a side wall of said feature.

8. An atomic force microprobe metrology system for measuring the dimensions of a structure on a sample including
   a) a vibrating atomic force microprobe which indicates when said microprobe is a given distance from the surface to be sensed, said microprobe having a plurality of protuberances for detection of the depth and width of a feature of the sample to be measured with one of said protuberances at the tip of said microprobe and at least one lateral one of said protuberances extending laterally from said microprobe for detecting the side wall of a said feature of said structure, said lateral one of said protuberances being spaced a distance d1 from said tip along the length of said microprobe, and
   b) means for measuring the forces on said protuberances for determining the depth and the location of the side walls of said feature.

9. A system in accordance with claim 8, wherein at least a pair of said protuberances protrude outwardly from said microprobe in opposing directions laterally from said vibrating microprobe, with at least one of said protuberances extending downwardly.

10. A metrology system in accordance with claim 8, wherein said means for measuring the forces produces output signals adapted for controlling motion of said vibrating microprobe.

11. A metrology system in accordance with claim 10, including
    means for adjusting the relative position of said vibrating microprobe and said sample as a function of said output signals,
    said means for adjusting being connected to receive said output signals from said means for measuring.

12. A metrology system for measuring the dimensions of a structure on a sample including,
    a) a vibrating microprobe which indicates when said microprobe is a given distance from the surface to be sensed, said microprobe having a plurality of protuberances protruding outwardly from said microprobe for detection of the depth and width of a feature of said sample to be measured and at least one of said protuberances extending laterally from said microprobe for detecting a side wall of said feature of said structure,
    b) means for measuring the forces on said protuberances for determining the depth and the location of a said side wall of said feature, and
    c) means for providing output signals indicative of the magnitude of said forces,
    d) means for adjusting the relative position of said microprobe and said sample in the vertical and horizontal directions as a function of said output signals, and
    e) said means for adjusting being connected to receive said output signals from said means for providing output signals.

13. An atomic force microprobe metrology system for dimensionally measuring a sample including
    a) a vibrating microprobe which indicates when said microprobe is a given distance from the surface to be sensed,
    b) means for moving said vibrating microprobe relative to said sample,
    c) means for detecting proximity of said vibrating microprobe to said sample and to the side walls of features of said sample providing output signals indicative of the vertical and transverse relationship of said vibrating microprobe to said sample, d) means for adjusting the relative position of said vibrating microprobe and said sample in the vertical and transverse directions as a function of said output signals, and e) said means for adjusting being connected to receive said output signals from said means for detecting.

14. A metrology system for dimensionally measuring a sample including a) a vibrating atomic force microprobe which indicates when said microprobe is a given distance from the surface to be sensed, said microprobe vibrating at a resonant frequency, b) means for moving said microprobe relative to said sample, c) means for detecting proximity of said microprobe to said sample and to the side walls of features of said sample providing output signals indicative of
 1) the vertical and transverse relationship of said vibrating microprobe to said sample, and
 2) the change in resonance of the tip of said microprobe being sensed in a plurality of individual directions by means for providing vertical laser heterodyne interferometry and means for providing transverse laser heterodyne interferometry, and d) means for adjusting the relative position of said microprobe and said sample in a plurality of directions as a function of said output signals, and e) said means for adjusting being connected to receive said output signals from said means for detecting.

15. A system in accordance with claim 14, wherein said means for adjusting provides adjustment in the vertical and transverse directions as a function of said output signals from said means for detecting.

16. A system in accordance with claim 14 wherein said microprobe includes protuberances with at least a pair of said protuberances protruding in opposing directions laterally from said microprobe, and with at least one of said protuberances protruding downwardly.

17. A metrology system for measuring the dimensions of a structure on a sample including a) a microprobe which indicates when said microprobe is a given distance from the surface to be sensed, said microprobe having a plurality of protuberances protruding from said microprobe for detection of the depth and width of a feature of the sample to be measured and at least one of said protuberances protruding laterally from said microprobe for detecting the side wall of a said feature of said structure, and b) means for measuring the forces on said protuberances for determining the depth and the location of the side walls of said feature.

18. A metrology system for measuring the dimensions of a structure on a sample including a) a elongated vibrating atomic force microprobe which indicates when said microprobe is a given distance from the surface to be sensed, said microprobe having a proximal end and a distal end with a plurality of protuberances proximate to said distal end, said protuberances being adapted for detection of the depth and width of a feature of the sample to be measured and at least one of said protuberances extending laterally from said microprobe for detecting the side wall of a said feature of said structure, and b) means for measuring the forces on said protuberances for determining the depth and the location of the side walls of said feature.

19. A system in accordance with claim 18, wherein at least a pair of said protuberances extend in opposing directions laterally from said vibrating microprobe, with at least one of said protuberances extending downwardly.

20. A metrology system in accordance with claim 18, wherein said means for measuring the forces produces output signals adapted for control of said vibrating microprobe.

21. A metrology system in accordance with claim 20, including means for adjusting the relative position of said vibrating microprobe and said sample as a function of said output signals,
said means for adjusting being connected to said means for measuring.

22. A metrology system for measuring the dimensions of a structure on a sample including, a) an elongated vibrating microprobe which indicates when said microprobe is a given distance from the surface to be sensed, said microprobe having a proximal end and a distal end, with a plurality of protuberances proximate to said distal end, said protuberances being adapted for detection of the depth and width of a feature of said sample to be measured and at least one of said protuberances extending laterally from said microprobe for detecting a side wall of said feature of said structure, b) means for measuring the forces on said protuberances for determining the depth and the location of a said side wall of said feature, and c) means for providing output signals indicative of the magnitude of said forces, and d) means for adjusting the relative position of said microprobe and said sample in the vertical and horizontal directions as a function of said output signals.

* * * * *